(12) United States Patent
Yoshioka et al.

(10) Patent No.: US 8,894,942 B2
(45) Date of Patent: Nov. 25, 2014

(54) ELECTRICALLY HEATED CATALYST

(75) Inventors: Mamoru Yoshioka, Susono (JP);
Takashi Watanabe, Gotennba (JP)

(73) Assignee: Toyota Jidosha Kabushiki Kaisha,
Aichi-ken (JP)

(*) Notice: Subject to any disclaimer, the term of this patent is extended or adjusted under 35 U.S.C. 154(b) by 55 days.

(21) Appl. No.: 13/821,595

(22) PCT Filed: Sep. 9, 2010

(86) PCT No.: PCT/JP2010/065526
§ 371 (c)(1),
(2), (4) Date: Mar. 8, 2013

(87) PCT Pub. No.: WO2012/032635
PCT Pub. Date: Mar. 15, 2012

(65) Prior Publication Data
US 2013/0164188 A1 Jun. 27, 2013

(51) Int. Cl.
*B01D 50/00* (2006.01)

(52) U.S. Cl.
USPC .................. 422/174; 422/177; 422/180

(58) Field of Classification Search
CPC ........... F01N 2330/10; F01N 2240/16; F01N 3/2013; F01N 3/2026; Y02T 10/26; B01D 53/9431
USPC .......................................... 422/174, 177, 180
See application file for complete search history.

(56) References Cited

U.S. PATENT DOCUMENTS 5,384,099 A * 1/1995 Sheller .................. 422/174
5,651,906 A * 7/1997 Whittenberger et al. ..... 219/552

FOREIGN PATENT DOCUMENTS

| JP | 5-269387 A | 10/1993 |
| JP | 05-096421 U | 12/1993 |
| JP | 2005-240634 A | 9/2005 |
| WO | 95/16110 A1 | 6/1995 |

* cited by examiner

*Primary Examiner* — Tom Duong
(74) *Attorney, Agent, or Firm* — Sughrue Mion, PLLC

(57) ABSTRACT

Electricity is suppressed from flowing to a case (4) of an electrically heated catalyst (1). Provision is made for a heat generation element (2) adapted to be electrically energized to generate heat, the case (4) in which the heat generation element (2) is contained, a mat (5) arranged between the heat generation element (2) and the case (4) to insulate electricity and at the same time to support the heat generation element (2), an electrode (6) connected to the heat generation element (2) from outside of the case (4), an insulation part (7) to plug a gap between the case (4) and the electrode (6), an electrode chamber (8) which is a space formed around the electrode (6) at an inner side of the case (4) and at an outer side of the heat generation element (2), and which is formed by providing a gap between the electrode (6) and the mat (5), and a partition part (9) arranged in the electrode chamber (8) at an upstream side of the electrode (6) in a direction of flow of an exhaust gas, in such a manner that the exhaust gas flowing through the interior of the electrode chamber (8) impinges against the partition part (9).

6 Claims, 4 Drawing Sheets

ELECTRICALLY HEATED CATALYST

CROSS REFERENCE TO RELATED APPLICATIONS

This application is a National Stage of International Application No. PCT/JP2010/065526filed Sep. 9, 2010, the contents of all of which are incorporated herein by reference in their entirety.

TECHNICAL FIELD

The present invention relates to an electrically heated catalyst.

BACKGROUND ART

There has been known a technique in which a mat of an insulating material is arranged between a carrier of a catalyst which is electrically energized to generate heat, and a case which contains therein the carrier of the catalyst (for example, see a first patent document). According to this mat, when the carrier of the catalyst is electrically energized, it is possible to suppress an electric current from flowing to the case. Incidentally, immediately after engine starting, etc., the temperature of electrodes is low, and hence, when an exhaust gas which has passed through the mat comes in contact with the electrodes, water or moisture in the exhaust gas may condense to the electrodes. Due to this water, insulation resistance between the electrodes and the case will decrease, so there is a fear that electricity may flow to the case from the electrode.

PRIOR ART REFERENCES

Patent Documents

First Patent Document: Japanese patent application laid-open No. H05-269387

SUMMARY OF THE INVENTION

Problems to be Solved by the Invention

The present invention has been made in view of the above-mentioned problem, and an object of the present invention is to suppress electricity from flowing to a case of an electrically heated catalyst.

Means for Solving the Problems

In order to achieve the above-mentioned object, an electrically heated catalyst according to the present invention is provided with:

a heat generation element that is adapted to be electrically energized to generate heat;

a case that contains said heat generation element therein;

a mat that is arranged between said heat generation element and said case, and serves to insulate electricity and at the same time to support said heat generation element;

an electrode that is connected to said heat generation element from outside of said case;

an insulation part that plugs a gap between said case and said electrode;

an electrode chamber that is a space formed around said electrode at an inner side of said case and at an outer side of said heat generation element, and is formed by providing a gap between said electrode and said mat; and a partition part that is arranged in said electrode chamber at an upstream side of said electrode in a direction of flow of an exhaust gas, in such a manner that the exhaust gas flowing through the interior of said electrode chamber impinges against said partition part.

The heat generation element may also be a carrier for the catalyst, or may be arranged at an upstream side of the catalyst. By electrically energizing the heat generation element, the heat generation element generates heat, so that the temperature of the catalyst can be raised. Incidentally, moisture is contained in the exhaust gas of an engine, so when the exhaust gas directly impinges against or comes into contact with the electrode or the insulation part at the time the temperature of the electrode or the insulation part is low, such as at the time of cold starting of the engine, etc., water may condense to the electrode or the insulation part. On the other hand, due to the provision of the partition part, the exhaust gas having flowed into the electrode chamber is suppressed from directly impinging against or coming into contact with the electrode and the insulation part. That is, the partition part is arranged at the upstream side of the electrode in the direction of flow of the exhaust gas, so at least a part of the exhaust gas having flowed into the electrode chamber impinges against the partition part before impinging against the electrode. Here, note that the direction of flow of the exhaust gas referred to herein is a direction of flow of the exhaust gas after the exhaust gas has flowed into the electrode chamber and before the exhaust gas impinges against the partition part. This direction of flow of the exhaust gas may also be in parallel to a direction of a central axis of the case or the heat generation element. Then, due to the provision of the partition part, at least a part of the exhaust gas does not directly impinge against the electrode, so it is possible to suppress water from condensing on the electrode and the insulation part. For this reason, it is possible to suppress electricity from flowing to the case. Here, note that a partition part can also be arranged in the electrode chamber at the downstream side of the electrode in the direction of flow of the exhaust gas. In addition, a partition part can also surround a circumference of the electrode.

Moreover, in the present invention, said partition part may be arranged on a path on which the exhaust gas having flowed into said electrode chamber goes straight toward said electrode, in said electrode chamber. That is, the partition part is arranged at a location through which the exhaust gas impinging against the electrode would flow in cases where it is assumed that there is no partition part. According to this, it is possible to suppress the exhaust gas from directly impinging against the electrode.

Further, in the present invention, said partition part may be composed of an electrically insulating material in cases where a distance between said partition part and said insulation part is less than a spatial distance which is required for insulation of electricity therebetween. Here, if the partition part is composed of an electrically conductive material, there will be a fear that when the distance between the partition part and the electrode becomes short, electric discharge may take place between the partition part and the electrode. That is, in cases where the distance between the partition part and the insulation part is less than the spatial distance required for insulation of electricity therebetween, there will be a fear that electric discharge may take place between the partition part and the electrode. On the other hand, by composing the partition part with an electrically insulating material, it is possible to suppress the occurrence of electric discharge between the partition part and the electrode.

Furthermore, in the present invention, said partition part may be composed of an electrically conductive material in cases where the distance between said partition part and said insulation part is equal to or larger than the spatial distance required for insulation of electricity therebetween. That is, because there is no fear that electric discharge may take place between the partition part and the electrode, the partition part can be composed of the electrically insulating material. As a result of this, for the partition part, there can be used a highly durable material, for example.

Effect of the Invention

According to the present invention, it is possible to suppress electricity from flowing to the case of the electrically heated catalyst.

MODE FOR CARRYING OUT THE INVENTION

Hereinafter, reference will be made to specific embodiments of an electrically heated catalyst according to the present invention based on the attached drawings. Here, note that the following embodiments can be combined as appropriate.

[First Embodiment]

Figure 1:
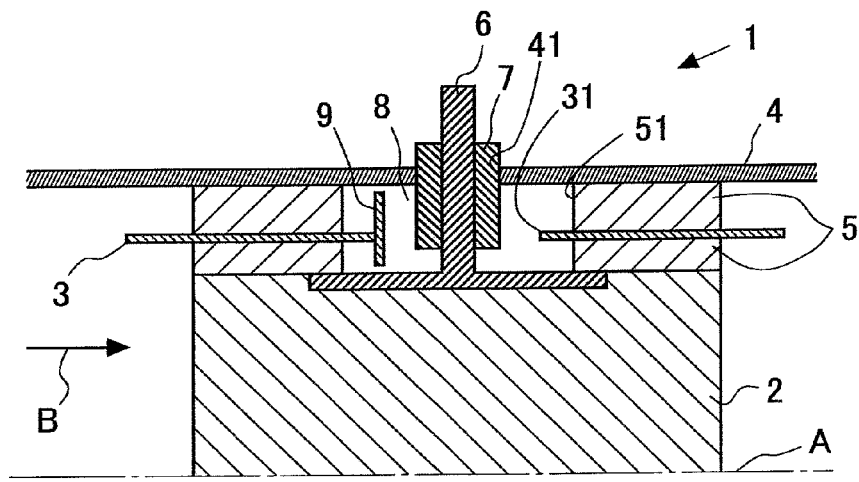
[FIG. 1] is a view showing the schematic construction of an electrically heated catalyst according to a first embodiment of the present invention.

FIG. 1 is a view showing the schematic construction of an electrically heated catalyst 1 according to this first embodiment of the present invention. Here, note that the electric heating catalyst 1 according to this embodiment is arranged in an exhaust pipe of an engine mounted on a vehicle. The engine may be a diesel engine or may be a gasoline engine. In addition, it can also be used in a vehicle which adopts a hybrid system equipped with an electric motor.

The electrically heated catalyst 1 shown in FIG. 1 is a cross sectional view cutting the electrically heated catalyst 1 along a central axis A thereof in a longitudinal direction thereof. Here, note that the electrically heated catalyst 1 has a shape with line symmetry with respect to the central axis A, and hence in FIG. 1, only an upper part thereof is shown. In addition, in FIG. 1, an arrow B shows the direction of the flow of an exhaust gas.

The electrically heated catalyst 1 according to this embodiment is provided with a catalyst carrier 2 which has a cylindrical shape around the central axis A. And, the catalyst carrier 2, an inner pipe 3, and a case 4 are provided sequentially from the side of the central axis A. In addition, a mat 5 is arranged between the catalyst carrier 2 and the inner pipe 3, and between the inner pipe 3 and the case 4.

A material, which has electric resistance and is electrically energized to generate heat, is used for the catalyst carrier 2. SiC is used for the material of the catalyst carrier 2, for example. The catalyst carrier 2 has a plurality of passages which extend in a direction B of the flow of the exhaust gas (i.e., it may be the direction of the central axis A), and which have a cross section of honeycomb shape vertical to the direction in which the exhaust gas flows. The exhaust gas flows through these passages. The catalyst carrier 2 has an outer shape which is a cylindrical shape centering on the central axis A of the exhaust pipe, for example. Here, note that the sectional shape of the catalyst carrier 2 formed by the cross section which is orthogonal to the central axis A may be an elliptical shape, for example. The central axis A is a central axis common to the exhaust pipe, the catalyst carrier 2, the inner pipe 3, and the case 4. Here, note that in this embodiment, the catalyst carrier 2 corresponds to a heat generation element in the present invention. In addition, this embodiment can be applied similarly even in cases where the heat generation element is provided at the upstream side of the catalyst.

The catalyst is carried or supported by the catalyst carrier 2. As the catalyst, there can be mentioned an oxidation catalyst, a three-way catalyst, an NOx storage reduction catalyst, an NOx selective reduction catalyst, etc., for example. Two pieces of electrodes 6 are connected to the catalyst carrier 2, so that the catalyst carrier 2 is electrically energized by applying a voltage between these electrodes 6. The catalyst carrier 2 generates heat due to the electric resistance of this catalyst carrier 2.

As the mat 5, there is used an electrically insulating material such as, for example, ceramic fiber which includes alumina as its main component. The mat 5 is wound around an outer peripheral surface of the catalyst carrier 2 and an outer peripheral surface of the inner pipe 3. The mat 5 covers the outer peripheral surface (the surface parallel to the central axis A) of the catalyst carrier 2, so that when the catalyst carrier 2 is electrically energized, the mat 5 serves to suppress electricity from flowing to the inner pipe 3 and the case 4.

As the material of the inner pipe 3, there is used an electrically insulating material such as, for example, alumina. The inner pipe 3 is formed into a tubular shape with the central axis A being located as a center thereof. The inner pipe 3 has a length in the direction of the central axis A longer than that of the mat 5. As a result, the inner pipe 3 protrudes from the mat 5 to an upstream side thereof and a downstream side thereof, respectively. An inside diameter of the inner pipe 3 is substantially the same as an outside diameter of the mat 5 at the time when the mat 5 is wound around the outer periphery of the catalyst carrier 2. For this reason, when the mat 5 and the catalyst carrier 2 are contained or inserted into the inner pipe 3, the mat 5 is compressed, so the catalyst carrier 2 is fixed into the inner pipe 3 due to a repulsive force or resilience of the mat 5.

Metal is used for the material of the case 4, and for example, a stainless steel material can be used. Inside the case 4, there are contained the catalyst carrier 2, the inner pipe 3, and the mat 5. An inside diameter of the case 4 is substantially the same as the outside diameter of the mat 5 at the time when the mat 5 is wound around the outer periphery of the inner pipe 3, and the mat 5 is compressed when the mat 5 and the inner pipe 3 is contained in the case 4, so the inner pipe 3 is fixed into the case 4 due to the repulsive force of the mat 5.

The two pieces of electrodes 6 are connected to the catalyst carrier 2. Holes 31, 41, 51 are opened in the inner pipe 3, the case 4, and the mat 5, respectively, in order to pass these electrodes 6 therethrough. The diameter of each of these holes 31, 41, 51 is larger than the diameter of each of the electrodes 6. For this reason, the inner pipe 3, the case 4 and the mat 5 are separated from the electrodes 6. Then, insulation parts 7, which serve to support the electrodes 6, respectively, are arranged in the holes 41, respectively, which are opened in the case 4. An electrically insulating material is used for the material of the insulation parts 7. In addition, the insulation parts 7 are arranged with no gap between the case 4 and the electrodes 6, respectively. In this manner, inside the case 4, there is formed an electrode chamber 8 in the form of a closed space around each of the electrodes 6.

In addition, the diameter of each hole 31, which is opened in the inner pipe 3, is smaller than the diameter of each hole 51, which is opened in the mat 5. As a result, the inner pipe 3 protrudes from the mat 5 into the interior of each of the electrode chambers 8. Then, the inner pipe 3 is provided with a plate 9 at an upstream side of each of the electrodes 6 in the direction of flow of the exhaust gas.

Each of the plates 9 serves to divide a part of a corresponding electrode chamber 8 at the upstream side of a corresponding electrode 6 into an upstream side chamber and a downstream side chamber. In an end of the inner pipe 3 which forms the holes 31, each plate 9 extends toward an inner side and an outer side of the inner pipe 3 vertically with respect to the central axis A. Each plate 9 may be of a flat plane, or may be of a curved plane. In addition, the shape of each plate 9 may be conformed to the shape of a corresponding hole 31 which is opened in the inner pipe 3. The material of the plates 9 may be the same as that of the inner pipe 3, or may be different therefrom.

These plates 9 are arranged in order that the exhaust gas flowing into the electrode chambers 8 is suppressed from directly impinging against or coming into contact with the electrodes 6 and the insulation parts 7. For example, each plate 9 is arranged in such a manner that it exists at the upstream side of a tip portion of a corresponding insulation part 7, i.e., at the upstream side of a location at which a corresponding electrode 6 is exposed from the insulation part 7. In addition, for example, the shape and the position of each plate 9 may be decided in such a manner that when the tip portion of the corresponding insulation part 7 is projected on the plate 9 in the direction B of the flow of the exhaust gas (which may also be the direction of the central axis A), at least a part of the tip portion of the insulation part 7 is projected on the plate 9. Moreover, each plate 9 may be arranged on a path on which the exhaust gas having flowed into a corresponding electrode chamber 8 goes straight toward a corresponding electrode 6 in the electrode chamber 8. The plates 9 need only be arranged in a manner as to interrupt at least a part of the exhaust gas which would impinge against the electrodes 6 or the insulation parts 7 when it is assumed that the plates 9 do not exist. That is, the size of each plate 9 may be smaller than that of a corresponding electrode 6 or a corresponding insulation part 7. In addition, the plates 9 are arranged in such a manner that they are not in contact with the case 4, the catalyst carrier 2, and the mat 5. Here, note that in this embodiment, each plate 9 corresponds to a partition part in the present invention.

In the electrically heated catalyst 1 as constructed in this manner, the water condensed at the upstream side of the catalyst carrier 2 may flow on the inner wall of the case 4, and may adhere to the mat 5. This water adheres to a portion of the mat 5 between the inner pipe 3 and the case 4. That is, because the inner pipe 3 protrudes to the upstream side and the downstream side of the mat 5, it is possible to suppress the water from coming into the inner side of the inner pipe 3. As a result of this, it is possible to suppress the case 4 and the catalyst carrier 2 from being short-circuited to each other by means of the water at an upstream end and a downstream end of the mat 5.

In addition, when particulate matter (hereinafter also referred to as PM) in the exhaust gas adheres to the mat 5 and/or the inner pipe 3, there is a fear that a short circuit may be formed between the case 4 and the catalyst carrier 2 by means of the particulate matter. However, because the inner pipe 3 protrudes from the mat 5, the protruded portions of the inner pipe 3 receive the heat of the exhaust gas, and become high in temperature, so the PM adhered to the inner pipe 3 can be removed by the oxidation thereof. According to this, it is possible to suppress the short circuit between the case 4 and the catalyst carrier 2 through the PM.

Incidentally, the water adhered to the mat 5 evaporates due to the heat of the exhaust gas and the heat of the catalyst carrier 2. However, as the amount of water adhered increases, a part thereof will stay in the interior of the mat 5, without evaporating immediately. Then, the water may reach up to the electrode chambers 8 around the electrodes 6 while passing through the interior of the mat 5. At the time of cold starting of the engine, the temperatures of the electrodes 6 and the insulation parts 7 are low, so when the exhaust gas impinges against the electrodes 6 and the insulation parts 7, water will condense on the surfaces of the electrodes 6 and the insulation parts 7. Thus, there will be a fear that when water condenses on the surfaces of the electrodes 6 and the insulation parts 7 in this manner, electricity may flow to the case 4 from the electrodes 6. Then, there will also be a fear that when there is a request to raise the temperature of the catalyst carrier 2, electrical energization thereof may become impossible.

On the other hand, due to the provision of the plates 9, the exhaust gas is suppressed from directly impinging against or coming into contact with the electrodes 6 and the insulation parts 7. In the electrodes 6 and the insulation parts 7, water is less prone to condense in places where the exhaust gas does not directly impinge, than in places where the exhaust gas directly impinges. That is, because of the provision of the plates 9, it is possible to suppress water from condensing on the electrodes 6 and the insulation parts 7.

Because water can be suppressed from condensing on the electrodes 6 and the insulation parts 7 in this manner, it is possible to suppress electricity from flowing to the case 4 from the electrodes 6.

Here, note that in this embodiment, it has been explained that the holes 31, 51 are opened in the inner pipe 3 and the mat 5, respectively, but instead of this, the inner pipe 3 and the mat 5 may each be divided into an upstream side portion and a downstream side portion on opposite sides of the electrodes 6. That is, the inner pipe 3 and the mat 5 may each be arranged around the catalyst carrier 2 separately at the upstream side and at the downstream side of the electrodes 6, respectively. According to such an arrangement, the electrode chambers 8 are formed in such a manner that they extend around the circumference of the catalyst carrier 2. Even in such a case, with the provision of the plates 9 which are arranged at the upstream side of the electrodes 6, the exhaust gas is suppressed from directly impinging against or coming into contact with the electrodes 6 and the insulation parts 7, so it is possible to suppress electricity from flowing to the case 4.

[Second Embodiment]

Figure 2:
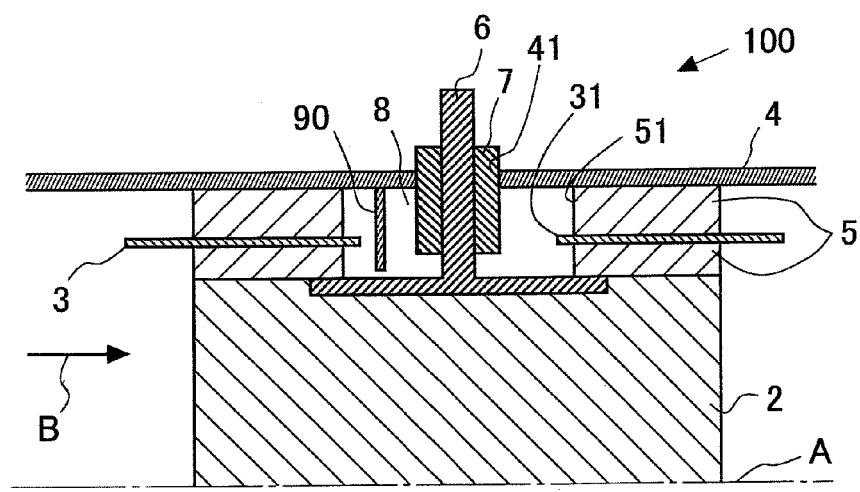
[FIG. 2] is a view showing the schematic construction of an electrically heated catalyst according to a second embodiment of the present invention.

FIG. 2 is a view showing the schematic construction of an electrically heated catalyst 100 according to this second embodiment of the present invention. In the first embodiment, the plates 9 are mounted on the inner pipe 3, but in this second embodiment, plates 90 are mounted on a case 4. Here, note that for the same members or components as those in the first embodiment, the same symbols are attached thereto, and an explanation thereof is omitted.

That is, the plates 90 extend in a direction toward the central axis A from the case 4. Each of the plates 90 has one end thereof at the side of the central axis A located at an outer side of the outer peripheral surface of the catalyst carrier 2 inside the electrode chambers 8, in such a manner as not to be in contact with the catalyst carrier 2. In addition, the plates 90 are arranged in a manner such that they are not in contact with the inner pipe 3 and the mat 5. The material of the plates 9 may be the same as that of the case 4, or may be different therefrom.

With the electrically heated catalyst 100 as constructed in this manner, too, it is possible to suppress the exhaust gas from directly impinging against the electrodes 6 and the insulation parts 7. That is, due to the provision of the plates 90, it is possible to suppress water from condensing on the electrodes 6 and the insulation parts 7. Because water can be suppressed from condensing on the electrodes 6 and the insulation parts 7 in this manner, it is possible to suppress electricity from flowing to the case 4 from the electrodes 6.

[Third Embodiment]

Figure 3:
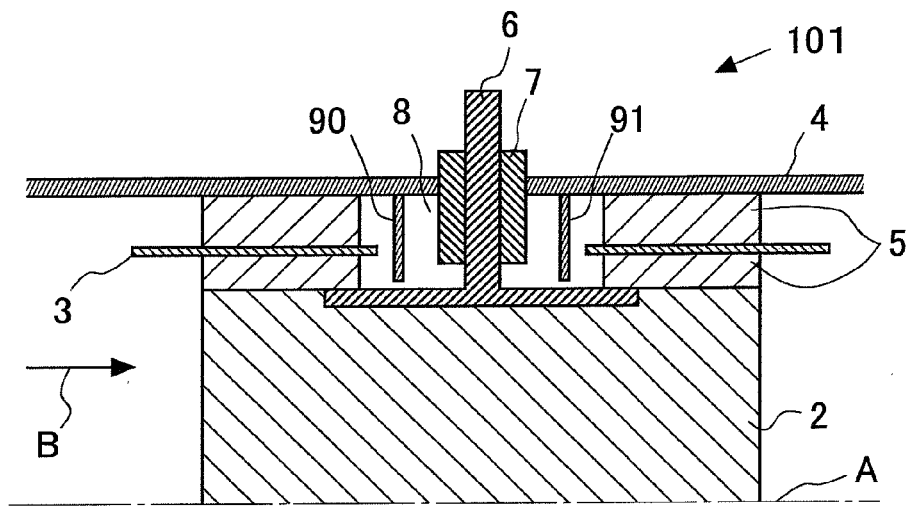
[FIG. 3] is a view showing the schematic construction of an electrically heated catalyst according to a third embodiment of the present invention.

FIG. 3 is a view showing the schematic construction of an electrically heated catalyst 101 according to this third embodiment of the present invention. In this embodiment, plates 90 are arranged at the upstream side of electrodes 6, respectively, and at the same time, plates 91 are arranged at the downstream side of the electrodes 6, respectively, too. Here, note that a cylinder centering on a central axis of each electrode 6 may also be arranged around the electrode 6 in such a manner as to surround the electrode 6. Also, note that for the same members or components as those in the first or second embodiment, the same symbols are attached thereto, and an explanation thereof is omitted.

The plates 91 at the downstream side of the electrodes 6, respectively, extend in a direction toward the central axis A from the case 4. The plates 91 have their one end at the side of the central axis A located at an outer side of the outer peripheral surface of the catalyst carrier 2 inside the electrode chambers 8, in such a manner as not to be in contact with the catalyst carrier 2. In addition, the plates 91 are arranged in a manner such that they are not in contact with the inner pipe 3 and the mat 5. The shapes of the plates 91 at the downstream side of the electrodes 6, and the shapes of the plates 90 at the upstream side of the electrodes 6 are in line symmetry with respect to the central axes of the electrodes 6, respectively. Here, note that the plates 90, 91 may be mounted on the inner pipe 3, similarly to the plates 9 in the first embodiment.

Thus, by providing the plates 91 at the downstream side of the electrodes 6, too, it becomes more difficult for the exhaust gas to impinge against the electrodes 6 and the insulation parts 7, and hence, it is possible to suppress water from condensing on the electrodes 6 and the insulation parts 7 in a more effective manner. For this reason, it is possible to suppress electricity from flowing to the case 4 from the electrodes 6.

[Fourth Embodiment]

Here, in cases where the distances from the electrodes 6 and the insulation parts 7 to the plates 9 are short, there will be a fear that when the electrodes 6 are electrically energized, electric discharge may occur between the electrodes 6 and the plates 9, and between the insulation parts 7 and the plates 9. On the other hand, it is possible to suppress the occurrence of electric discharge by using an electrically insulating material for the material of the plates 9. Accordingly, in this fourth embodiment, in cases where the spatial distances of the electrodes 6 and the insulation parts 7 to the plates 9 are shorter than a lower limit value of a distance (hereinafter referred to as a required spatial distance) at which electric discharge does not occur, an electrically insulating material is used for the material of the plates 9. The required spatial distance can also be said as a spatial distance which is required for insulation of electricity.

Figure 4:
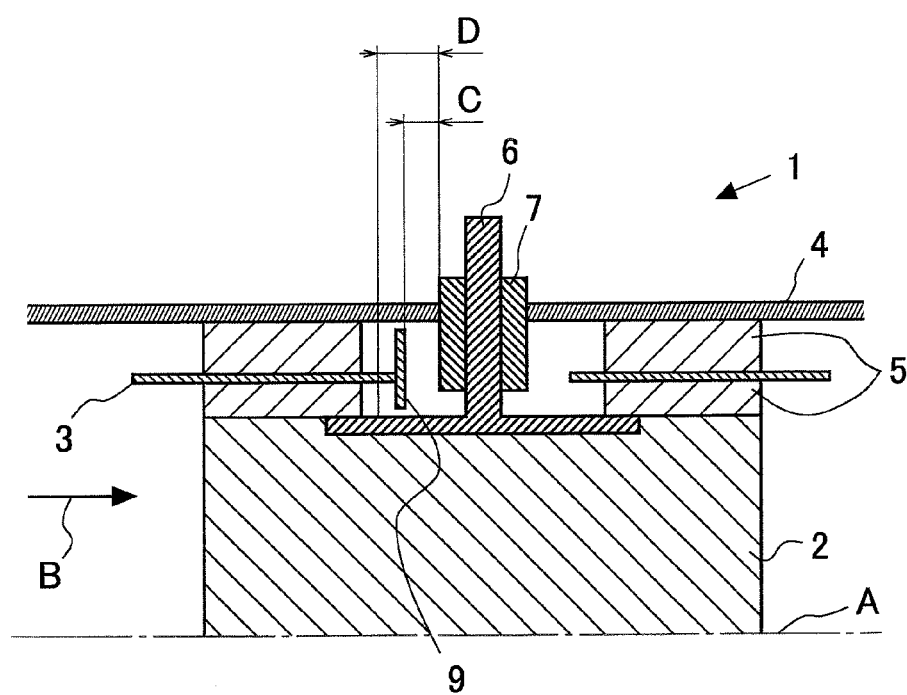
[FIG. 4] is a view showing the relation between a required spatial distance and a distance from an electrode and an insulation part to a plate.
Figure 5:
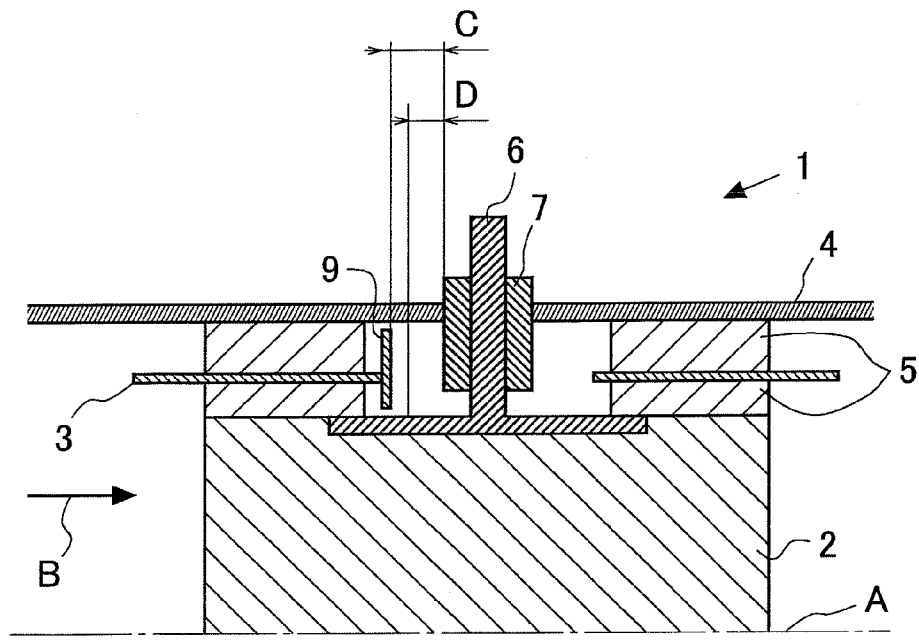
[FIG. 5] is a view showing the relation between a required spatial distance and a distance from an electrode and an insulation part to a plate.

FIG. 4 and FIG. 5 are views showing relations each between a required spatial distance D and a distance C from an electrode 6 and an insulation part 7 to a plate 9. In FIG. 4, the distance C from the electrode 6 and the insulation part 7 to the plate 9 is shorter than the required spatial distance D. In this case, an insulating material is used for the material of the plate 9. On the other hand, in FIG. 5, the distance C from the electrode 6 and the insulation part 7 to the plate 9 is longer than the required spatial distance D. In this case, it is not necessary to use an insulating material for the material of the plate 9, and an electrically conductive material can be used, so, for example, a stainless steel material, which is excellent in durability, can be used. Here, note that an insulating material can also be used for the material of the plate 9, irrespective of the distance C from the electrode 6 and the insulation part 7 to the plate 9.

In this manner, in cases where electric discharge can occur between the electrode 6 and the plate 9, and between the insulation part 7 and the plate 9, it is possible to suppress electricity from flowing to the case 4 from the electrode 6, by the use of an insulating material for the material of the plate 9. In addition, in cases where electric discharge can never occur, the durability of the plate 9 can be improved by the use of an electrically conductive material for the material of the plate 9.

Similarly, in cases where the distance from the plate 9, 90 or 91 to the case 4 or the catalyst carrier 2 is short, there will be a fear that when the electrodes 6 are electrically energized, electric discharge may occur between the case 4 and the plate 9, 90 or 91, or between the catalyst carrier 2 and the plate 9, 90 or 91. Accordingly, in this embodiment, in cases where an electrically conductive material is used for the plate 9, 90, or 91, the spatial distance between the case 4 and the plate 9, 90, or 91 or between the catalyst carrier 2 and the plate 9, 90, or 91 may be made longer than the required spatial distance D.

Figure 6:
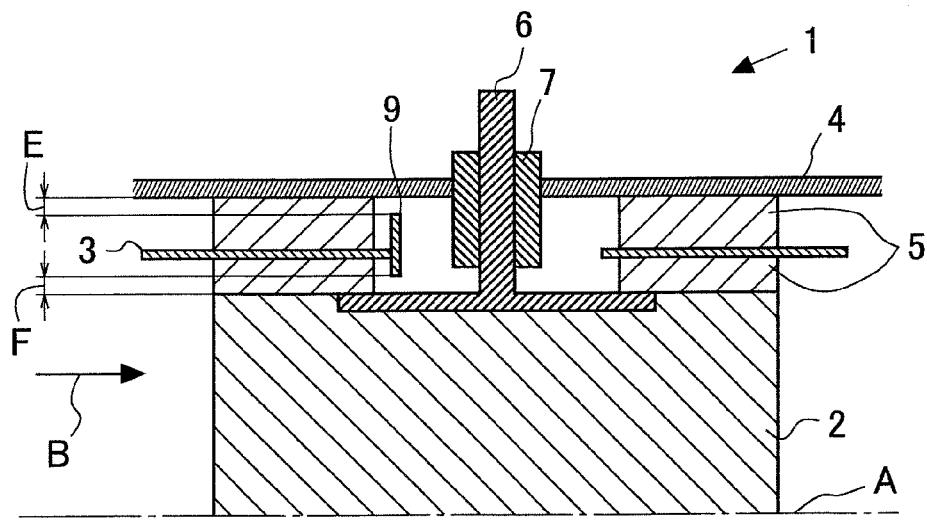
[FIG. 6] is a view showing the relation between a distance from a plate to a case, and a distance from a plate to a catalyst carrier.

FIG. 6 is a view showing the relation between a distance E from the plate 9 to the case 4, and a distance F from the plate 9 to the catalyst carrier 2. In cases where an electrically conductive material is used for the plate 9, the shapes of the respective members are decided in such a manner that the sum of the distance E from the plate 9 to the case 4, and the distance F from the plate 9 to the catalyst carrier 2 becomes equal to or more than the required spatial distance D.

Figure 7:
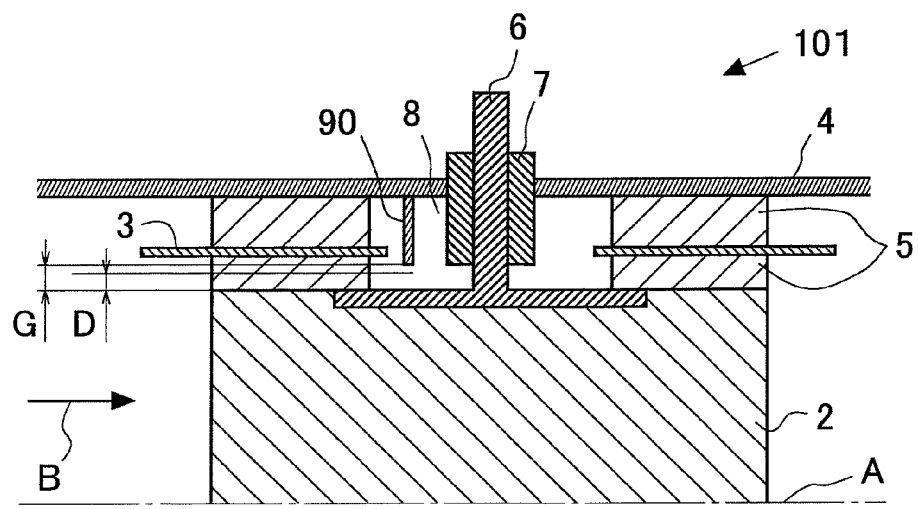
[FIG. 7] is a view showing the relation between a required spatial distance and a distance from a plate to a catalyst carrier.

In addition, FIG. 7 is a view showing the relation between the required spatial distance D, and a distance G from a plate 90 to a catalyst carrier 2. In cases where an electrically conductive material is used for the plate 90, the shapes of the respective members are decided in such a manner that the distance G from the plate 90 to the catalyst carrier 2 becomes equal to or more than the required spatial distance D. In cases where the plate 91 is arranged at the downstream side of the electrode 6, a similar consideration can be made.

In this manner, it is possible to suppress electricity from flowing to the case 4 through the plate 9, 90 or 91.

Explanation of Reference Numerals and Characters 1 electrically heated catalyst
2 catalyst carrier
3 inner pipe 4 case
5 mat
6 electrodes
7 insulation parts
8 electrode chambers
9 plates
31 holes
41 holes
51 holes

The invention claimed is:

1. An electrically heated catalyst comprising:
   a heat generation element that is adapted to be electrically energized to generate heat;
   a case that contains said heat generation element therein;
   a mat that is arranged between said heat generation element and said case, and serves to insulate electricity and at the same time to support said heat generation element;
   an electrode that is connected to said heat generation element from outside of said case;
   an insulation part that plugs a gap between said case and said electrode;
   an electrode chamber that is a space formed around said electrode at an inner side of said case and at an outer side of said heat generation element, and is formed by providing a gap between said electrode and said mat; and
   a partition part that is arranged in said electrode chamber at an upstream side of said electrode in a direction of flow of an exhaust gas, in such a manner that the exhaust gas flowing through the interior of said electrode chamber impinges against said partition part.

2. The electrically heated catalyst as set forth in claim 1, wherein said partition part is arranged on a path on which the exhaust gas having flowed into said electrode chamber goes straight toward said electrode, in said electrode chamber.

3. The electrically heated catalyst as set forth in claim 2, wherein said partition part is composed of an electrically insulating material in cases where a distance between said partition part and said insulation part is less than a spatial distance which is required for insulation of electricity therebetween.

4. The electrically heated catalyst as set forth in claim 2, wherein said partition part is composed of an electrically conductive material in cases where a distance between said partition part and said insulation part is equal to or larger than a spatial distance which is required for insulation of electricity therebetween.

5. The electrically heated catalyst as set forth in claim 1, wherein said partition part is composed of an electrically insulating material in cases where a distance between said partition part and said insulation part is less than a spatial distance which is required for insulation of electricity therebetween.

6. The electrically heated catalyst as set forth in claim 1, wherein said partition part is composed of an electrically conductive material in cases where a distance between said partition part and said insulation part is equal to or larger than a spatial distance which is required for insulation of electricity therebetween.

* * * * *